United States Patent
Stevens

(10) Patent No.: US 11,293,170 B2
(45) Date of Patent: *Apr. 5, 2022

(54) DEVICE AND METHODOLOGY FOR EARLY DETECTION OF FLUID LOSS AND NOTIFICATION AND SYSTEM SHUTDOWN FOR A CLOSED LOOP FLUID HEAT TRANSFER SYSTEM

(71) Applicant: Lee Hiram Stevens, Erie, CO (US)

(72) Inventor: Lee Hiram Stevens, Erie, CO (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/774,252

(22) Filed: Jan. 28, 2020

(65) Prior Publication Data

US 2020/0158586 A1 May 21, 2020

Related U.S. Application Data

(63) Continuation of application No. 15/757,519, filed as application No. PCT/US2017/065829 on Dec. 12, 2017, now Pat. No. 10,677,674.

(Continued)

(51) Int. Cl.

| | |
|---|---|
| *G01M 3/26* | (2006.01) |
| *E03B 7/00* | (2006.01) |
| *G01L 7/08* | (2006.01) |
| *F24D 3/10* | (2006.01) |
| *F24D 11/00* | (2022.01) |
| *F24D 3/12* | (2006.01) |
| *F24D 3/04* | (2006.01) |

(Continued)

(52) U.S. Cl.
CPC ............ *E03B 7/003* (2013.01); *E03B 7/071* (2013.01); *F24D 3/04* (2013.01); *F24D 3/06* (2013.01); *F24D 3/08* (2013.01); *F24D 3/10* (2013.01); *F24D 3/12* (2013.01); *F24D 11/00* (2013.01); *F24D 19/1009* (2013.01); *F24H 9/165* (2013.01); *G01L 7/08* (2013.01); *G01M 3/02* (2013.01); *G01M 3/26* (2013.01)

(58) Field of Classification Search
CPC .......... G01M 3/26; F24D 3/02; F24D 3/1016; F24D 19/1015
See application file for complete search history.

(56) References Cited

U.S. PATENT DOCUMENTS

| | | |
|---|---|---|
| 4,147,302 A | 4/1979 | Gray |
| 6,557,774 B1 | 5/2003 | Krueger |

(Continued)

FOREIGN PATENT DOCUMENTS

| | | |
|---|---|---|
| EP | 0195335 | 1/1998 |
| GB | 2376290 | 12/2002 |

(Continued)

*Primary Examiner* — Alexander A Mercado
(74) *Attorney, Agent, or Firm* — Leyendecker & Lemire LLC

(57) ABSTRACT

A hydronic system and method of use that will maintain normal system operating pressure while also reliably detecting even very small fluid losses in any closed loop fluid heat transfer system is described. The system includes a controller having clock or timing functionality in communication with one or more pressure sensors and a fluid supply valve that provides one or more notifications when the pressure drops below predetermined levels during predetermined periods of time. Depending on the nature of the pressure loss, the system has the capability of opening a fluid supply valve to provide make up fluid and increase system pressure.

14 Claims, 9 Drawing Sheets

Related U.S. Application Data

(60) Provisional application No. 62/554,259, filed on Sep. 5, 2017, provisional application No. 62/434,762, filed on Dec. 15, 2016.

(51) Int. Cl.
| | | |
|---|---|---|
| *F24D 19/10* | (2006.01) | |
| *F24D 3/08* | (2006.01) | |
| *F24D 3/06* | (2006.01) | |
| *E03B 7/07* | (2006.01) | |
| *F24H 9/16* | (2022.01) | |
| *G01M 3/02* | (2006.01) | |

(56) References Cited

U.S. PATENT DOCUMENTS

| | | |
|---|---|---|
| 2007/0186873 A1 | 8/2007 | Polkhouskiy |
| 2008/0083526 A1 | 4/2008 | Young |
| 2010/0313958 A1 | 12/2010 | Patel |
| 2014/0291411 A1 | 10/2014 | Tamski |
| 2015/0033779 A1 | 2/2015 | Seggerman |

FOREIGN PATENT DOCUMENTS

| | | |
|---|---|---|
| GB | 2405702 | 3/2005 |
| WO | WO2017027857 | 2/2017 |

DEVICE AND METHODOLOGY FOR EARLY DETECTION OF FLUID LOSS AND NOTIFICATION AND SYSTEM SHUTDOWN FOR A CLOSED LOOP FLUID HEAT TRANSFER SYSTEM

RELATED APPLICATIONS

This continuation application claims the benefit of national stage entry U.S. patent application Ser. No. 15/757,519 filed on Mar. 5, 2018. U.S. application Ser. No. 15/757,519 in turn claims priority to PCT application PCT/US17/65829 filed on Dec. 12, 2017. The PCT application in turn claims priority to two U.S. Provisional Patent Applications having the same inventor as the present application: namely, application No. 62/434,762 filed on Dec. 15, 2016 and having the title "Device and methodology for early detection of fluid loss and notification and system shutdown for a closed loop fluid heat transfer system"; and application No. 62/554,259 filed on Sep. 5, 2017 having the same title as the previous provisional application. All the related applications are incorporated herein by reference in their entireties.

BACKGROUND

Serious damage can result to homes or structures that incorporate a liquid heat transfer system should the system be breached, either by a slow leakage loss over a long period of time, or by a sudden catastrophic breach of the system. Typical hydronic systems incorporate a boiler feed valve with a backflow preventer, to replace normal water volume losses, which has a component caused by air coming out of solution and being removed by an air separator. A bladder type expansion tank modulates volume due to temperature changes, to maintain system pressure within a narrow range, and will only accommodate very minor actual loss of water volume. The feed valve adds water if and when the system falls below the normal operating set pressure. It is common to operate the system with this feed valve supplied at all times by the incoming water supply line, so that make-up water can be added as called for.

A very slow leak that develops anywhere in the system may cause a continual water loss less than the rate of fill, and thus may continue for an extended period of time, resulting in possibly hidden and possibly severe water or mold damage before the leak is discovered, even though the heating system may continue to provide heat as usual. A sudden catastrophic breach may result in a very large amount of water being released before discovery, particularly if the structure is not occupied at the time the breach occurs. If the feed valve is able to supply water at a rate at least equal to the rate of water loss, the system will continue to operate, but at greatly diminished heat output and all the while discharging large volumes of water into the structure. With heating disabled, the structure may fall below freezing temperature inside, leading to further damage to the heating and or plumbing systems.

It is a practice of some heating equipment installers to operate a newly filled system for a certain period of time, to remove the bulk of the air in solution, and then close the incoming water supply to the feed valve. This has the effect of limiting possible water release to the amount of water contained within the system, assuming any breach is at the lowest point, or to the amount of water released to bring system pressure to either zero, or to the point of activating a low water cutoff or a low pressure shut-off, either of which may be incorporated in the heating appliance. In a typical medium size residence, the volume loss to reduce pressure to that of static head may be as little as 16 fluid ounces.

This approach of isolating the system prevents catastrophic water damage to the structure, but a very slow leak may reduce system pressure to the point that the circulator pump will cavitate due to insufficient pressure to maintain fluid on the suction side. At that point, it is likely that the pump will burn out due to running dry because of an unsatisfied call for heat. The safety shutoffs on the appliance may or may not come into play, and the likely first warning of a problem is a drop in temperature in the structure, with no readily observable cause. A structure space temperature monitoring system may only be activated after there is a circulator pump failure, necessitating replacement of now failed equipment, which can be problematic during nights and holidays.

Water sensor monitoring systems well known in the prior art have the limitation that they will only detect fluid loss at the location of the sensor. The most damaging leaks in hydronic systems occur at locations remote from the appliances, usually within wall or floor assemblies, and are not initially readily observed until there is a significant water loss and or consequent damage. Water flow monitoring systems are employed as whole-house domestic water system leak detectors. These systems cannot adequately protect the hydronic heating system in an occupied structure. The allowable flow levels must of necessity be far greater than the smallest potential leaks in the hydronic system. If a flow-monitoring detector is dedicated to the hydronic system, that system must be continuously open to supply pressure, in order to detect a flow condition. The detector must then decide if flow is excessive, and actively close off the supply water. Very low leakage rates may be below the sensitivity of such detectors, or less than the allowable volume for a given time period.

If a hydronic system is closed off from the supply water source, it is possible for leakage to disable the circulator pump without any flow being indicated by the detector. A hydronic system requires only a minimum pressure to maintain function. Monitoring flow into the system must therefore infer a pressure condition in order to decide what protective actions to undertake. Heating systems may equally easily develop a leak in both occupied and unoccupied structures, whether in heating mode or during seasonal shutdown, so that a leak detector and safety shutdown must perform equally well under all these circumstances.

Infrared imaging cameras may be successfully used to locate leaks in a hot water heating system, which may occur within floor or wall assemblies, and are thus not readily observable. In typical trade practice, this method will only be employed after the likelihood of a leak has been established, which may come well after the initiation of a very slow and damaging leak into the structure.

An existing device has the primary purpose of a complete separation of the hydronic system from the domestic water supply. Make-up fluid is stored in a tank, and added to the hydronic system by a pump, which is controlled by a pressure switch. This allows for the use of fluids other than water. Leakage is measured indirectly, via an alarm signal when the storage tank is depleted. There may not be any notification of a very slow leak in the hydronic system until long after initiation, which may result in considerable hidden damage.

Another existing device monitors pressure in an isolated hydronic system, and in the most basic configuration, merely reports a drop in pressure to a preset warning level. It is the responsibility of the warning recipient to take an explicit action to add fluid to the system. An enhancement includes the ability to actively open a supply valve to restore pressure. This version will only warn of presumed leakage if the restore function happens too frequently in a given time period, and may allow for feeding of a very slow leak indefinitely, with consequent hidden damage as the result.

The increase in use of hot water radiant heating systems has resulted in an increase in a particularly insidious type of leak and subsequent water damage. These systems incorporate a large amount of water filled tubing directly under the subfloor, or even the flooring material itself. It is very easy to penetrate the tubing with a misplaced fastener, either during construction or after occupancy. Pneumatic staples and finish nails and drywall screws are the most likely culprits, and any may penetrate one wall or both sides of the tube. The penetration may be sealed by the tubing material sufficiently to hold pressure during a pressure test normally performed during the construction phase of the project.

A fastener may also penetrate and be sealed by the tubing after the system is filled and running, when a much lower operating pressure is in the system than during testing. In either case, the water in the heating system will start a slow process of corroding the fastener and or the aluminum layer of a Pex-AL-Pex tube. At some point, typically a number of months after start-up, water pressure will force its way around the degraded fastener, and a leak ensues.

DETAILED DESCRIPTION OF THE INVENTION

Overview

Figure 1:
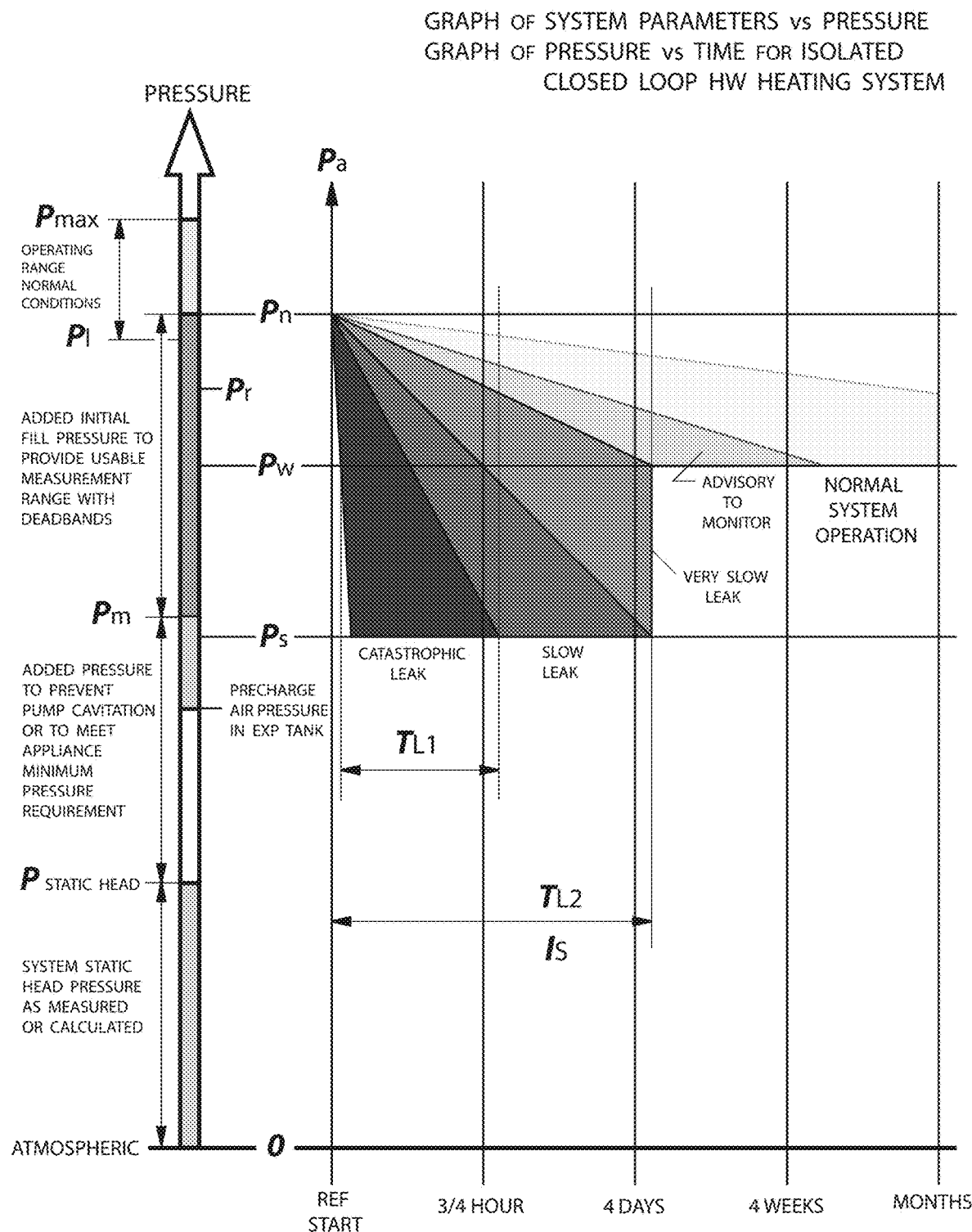
FIG. 1 is a graph of parameters pertaining to embodiments of a leak detection system as plotted against system pressure, and a graph of system pressure against time for various circumstances of pressure loss in closed loop fluid heat transfer system.

Embodiments of the invention comprise a device and method of use that will maintain normal system operating pressure while also reliably detecting even very small fluid losses in any closed loop fluid heat transfer system that incorporates a pressure regulated means of supplying make-up fluid, and also an air separator and air vent and a properly sized bladder type expansion tank. Make-up fluid is typically introduced into said hydronic systems at a point on the system piping between said expansion tank and said air separator, at what is termed the "point of no pressure change".

When the circulator pump is operating, fluid flow generates a dynamic pressure, which is offset by a loss of static pressure. Resistance to flow steadily reduces this dynamic pressure in the piping system, as the fluid flows through the piping loop. A pressure regulated fluid supply entering the system where flow can occur would constantly be trying to compensate for dynamic pressure changes, resulting in overfilling and then fluid release through the pressure relief valve.

The point of no pressure change is a vital concept, as it allows for accurate filling and maintenance of system pressure under all conditions of operation. The bladder type expansion tank typically has a pre-charge air pressure that is equal to or slightly less than the desired system fill pressure. The fill pressure must always be greater than the static head pressure of the system, in order to maintain pressure on the suction side of the circulator pump under all conditions.

After filling the system the air is purged from the fluid, and fluid topped up to operating pressure as necessary. Typically these systems are filled cold, so that even idle at room temperature, the contained fluid expands slightly, and expands more so as operating temperature increases. This thermal expansion is accommodated by the fluid pushing into the bladder of the expansion tank, with a corresponding slight increase in system pressure due to the compression of the contained pre-charge air on the opposite side of the bladder.

If the system is now isolated from the source, such that the feed valve is dis-allowed from adding fluid, pressure at the point of "no pressure change" can vary only due to change in volume due to thermal expansion and contraction, loss of volume due to extraction of entrained air, or loss of fluid mass due to leakage of any type. This is illustrated conceptually in FIG. 1. Thermal expansion and contraction by itself will typically result in measured pressure modulating in a range above the initial fill pressure, and presents no issues. Extraction of air is a very slow process, which becomes slower over time, and results in a very small change in volume. This volume loss may eventually be so slight as to only need compensating for after a period of months, or even a year.

In a typical residential system, normal operating pressure may be reduced below system minimum pressure with the loss of as little as one pint of fluid. If the fluid volume is reduced by any cause, the pressure will drop slightly until all of the initial fluid volume in the bladder is evacuated. Any further volume loss will result in a near instantaneous drop in pressure, first to that of the static head of the system, and then the pressure will fall further depending on how much fluid loss and draining down of the system may occur.

Systems depicted each show a system comprised of a hot water appliance and associated system components, and imply the presence of distribution tubing, such as underfloor radiant tubing, but the scope of this invention is not limited to such examples. In the example drawings, the relative positions of the air separator, air vent, expansion tank, feed valve, system shutoff valve and pressure transducers or switches, with respect to each other in the vertical plane, may be construed as the true relationship in the vertical plane in an actual hydronic installation although the actual vertical distances or ratios of the vertical distances between these various components may be different in the actual hydronic system.

Said physical relationships may allow for the extraction and release of trapped air from the system as a whole, and may also prevent disruptive air accumulation at said expansion tank and said pressure transducers or switches. As illustrated in the example drawings, the piping between said elements typically embody no reverse traps or negative slopes. Other physical relationships are contemplated, that differ from the relationship of the various system components shown, and that substantially prevent and minimize the entrapment of air within the system piping between any of the system shutoff valve, the expansion tank and the air separator.

The method of use of an embodiment of this invention is to allow the feed valve to fill said system to a set pressure value, above the minimum pressure to maintain normal functioning, and then close said system off from said fluid supply source. A pressure transducer with sufficient sensitivity may generate a signal proportional to actual pressure of said system, which may then be utilized to indicate actual loss of fluid volume in said system.

Embodiments of the invention incorporate a power actuated normally closed system shutoff valve in the piping connecting said fluid source to said hydronic system. Said valve thus isolates said hydronic system and allows or dis-allows the possible addition of fluid into said system through said feed valve. With said system shutoff valve closed, fluid may only be lost from said system, and system pressure will respond to volume change due to fluid or volume loss of any causation.

Embodiments of the invention may open said system shutoff valve only for a limited duration, and only after a time delay, in response to a preset falling pressure, and only if associated with a moderate and tolerable loss of fluid volume. Opening of said system shutoff valve may allow said feed valve to restore system pressure and maintain normal system operation. A further loss of pressure, to below the established system minimum operating pressure, is indicative of a serious and probably ongoing loss of volume. If at any time such a reduced pressure level may be detected, said controller may disable the system shutoff valve and a system circulator pump, and possibly also the appliance, to prevent possible equipment failure. Said controller may also issue warning notifications of any type, as will be described.

A second method of use may be to open said system shutoff valve at calendar or timed intervals for only a short duration, thus allowing said feed valve to compensate if and as necessary, for small volume losses of any expected cause such as extraction of dissolved air. This invention may allow for said system to become self-regulating as regards fluid volume, but at all times said system and the surrounding structure is protected from unrestrained fluid loss emanating from any part or location of entire said hydronic system. Leakage is deduced by means of monitoring system pressure, and not by discovery of actual leaked fluid, which leakage may occur anywhere in the system piping, fittings and components.

Hydronic systems typically employ a feed valve that is allowed to directly and immediately respond to any changes to actual system pressure relative to a single setpoint. Embodiments of this invention rely on measuring and then regulating system pressure as a step function. It is unnecessary to continuously log pressure data in order for the invention to function as intended.

Pre-programmed time intervals may be employed as a notch filter, and look forward from a realized point of intermediate but not directly disabling pressure loss. Said controller then is able to separate critical events from ordinary and necessary system pressure maintenance. In said second method, the action of maintaining system pressure is dis-associated from the response to potentially damaging pressure loss, in order to preclude feeding any system leakage.

Definitions

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front and lateral are relative to each other and are dependent on the specific orientation of an applicable element or article, and are used accordingly to aid in the description of the various embodiments and are not necessarily intended to be construed as limiting.

In this description, "system" shall refer to the totality of the physical components and piping of a hydronic heat transfer system as is typically installed.

The "appliance" is the source or equipment, such as a hot water boiler or heat pump that heats and or cools the fluid, for distribution to the point of use.

In this description, "domestic system" shall refer to the totality of the physical components and piping of a domestic water supply system as is typically installed, exclusive of the components of said hydronic heating system.

In this description, "controller" shall refer to the totality of the physical components, which receive system inputs, analyze said inputs, and respond with actions or signals as has been programmed or installed. Said controller can consist of, but is not limited to, any of a programmable logic controller, a dedicated microprocessor, analog to digital input-output device, mechanical or electromechanical timing devices, and associated power supplies, displays, switches, relays and indicator lights. Said controller can also incorporate any type of wired or wireless Internet connectivity, or wireless connectivity to any type of mobile device.

The description refers frequently to the components commonly found in residential hydronic heating systems, but this should not be construed as limiting the application of this device to only such systems.

Terminology

System Parameters, Setpoints and Programmable Values May be as Follows:

A) Pa Actual System Pressure
   Pa is the actual system pressure, as measured at the previously described point of no pressure change, at any given moment in time.

B) Pmax Maximum Normal System Operating Pressure
   Pmax is the greatest pressure value encountered during normal system operation, which allows for variations due to thermal expansion and contraction of the fluid volume, as mediated by the bladder type expansion tank. Said tank may be sized to prevent Pmax from exceeding the set value of a pressure relief valve as is typically installed in hydronic systems, thus preventing unintended loss of fluid from said system.

C) Pl Lowest Normal System Operating Pressure
   Pl is the lowest pressure value encountered during normal system operation, which allows for variations due to thermal expansion and contraction of the fluid volume, as mediated by the bladder type expansion tank.

D) Pm Minimum System Operating Pressure
   Pm is the minimum operating pressure at which all components of said system will continue to operate and transfer heat as designed, without mechanical failure due to adverse conditions. Pm can be established as the greater of the minimum operating pressure of the appliance, or, of the sum of the static head pressure of the system plus the minimum pressure required to prevent cavitation at the circulator pump or pumps. Static head pressure for water systems may be roughly calculated as one half the total system piping height in feet, expressed as pounds per square inch, and typically a residential hydronic system requires about 5 psi additional to ensure that the circulator pump may operate properly without cavitation. Once established, this value for Pm may be entered into the controller as an operating parameter.

E) Pn Normal System Operating Pressure (Third Pressure Set Point)
   Pn is the normal operating pressure of the system, which can be physically realized by the manual adjustment of the feed valve. Said pressure can be a differential above the minimum operating pressure such that one or more distinct alarm condition setpoints may be reached as the system pressure falls, while maintaining a deadband between each setpoint that will usually exceed twice the sensitivity of the pressure sensor or of the feed valve pressure regulator mechanism. In an embodiment of the invention, Pn may be entered into the controller as an operating parameter.

F) Pw Pressure at First Warning Notification (First Pressure Set Point)
   Pw is the Pa reached on falling system pressure at which the controller will typically send a first notification and or enable an alarm as shall be described below. This value is less than Pl and greater than Ps by typically an increment greater than twice the sensitivity of the pressure transducer, such that a deadband will exist between Pw and Ps. Pw may be established and programmed into the controller during setup of the system.

G) Ps System Shutdown Pressure (Second Pressure Set Point)
   Ps is the Pa reached on falling system pressure at which said controller will typically send a second notification and/or enable an alarm as shall be described below and in some embodiments may also de-energize one or more system components as shall be described below, and may also lock out the energizing of said system shutoff valve (Fluid supply valve) to limit further fluid loss. De-energizing system components will protect the structure from continued fluid loss, and protect the appliance and or the circulator pump(s) from mechanical damage due to running dry. If said controller of a particular embodiment has the ability to communicate via the Internet, persons or entities at remote locations may be apprised of the system shutdown. Warning of a heating system shutdown is typically provided earlier in embodiments of the present invention than would be in a system utilizing a prior art structure space temperature sensing device, which would likely not provide an alert until after system components had failed. Ps can be established as the Pa less than the Pm by an increment greater than the sensitivity of the pressure sensor, such that a deadband will exist between Pm and Ps, thus allowing the system to operate at the established Pm. Ps is typically established and programmed into the controller during the startup of the system.

H) Pr Alarm Reset Pressure
   Pr is the Pa reached on rising pressure that may cancel previous notifications and/or safety shutdown commands, and may also send a notification to that effect by any means as shall be described below. Pr may be established as the Pa greater than Pw and also less than Pn usually by an increment greater than the sensitivity of the pressure sensor or of the feed valve, such that there is a deadband between Pr and Pn, and may be programmed into the controller during system startup.

I) $T_{L1}$ First Time Interval for Lockout of Shutoff Valve Actuation (First Predetermined Period of Time)
   $T_{L1}$ is a time parameter used in an embodiment of this invention. $T_{L1}$ is the set duration of time between starting and ending a first consecutive timing function of said controller, commencing when Pa falls to Pw. $T_{L1}$ may be an embodied value in said controller, or may be programmed and or altered specific to a given system. Initiation of said first timing function may preclude any subsequent re-initiation of said first timing function until the conclusion of a third consecutive timing function of duration $T_{L2}$.

J) Do Time Duration For Energizing of the System Shutoff Valve (Second Predetermined Period of Time)
   Do is a time parameter used in an embodiment of this invention. Do is the set duration of time between starting and ending a second consecutive timing function of said controller, commencing at the end of $T_{L1}$. Do is the duration of time during which the system shutoff valve may be energized, but is also subject to any other constraints or limitations of operation. Do may be established during system setup by measuring the minimum time required to raise Pa from Ps to Pn (also referred to herein as "fill time"), under normal incoming fluid supply pressure, and adding a time increment in order to achieve full possible pressure Pn while also allowing for variations in system conditions. Do may be programmed into said controller during system setup. Do will enable said feed valve to compensate for the worst allowable pressure loss that may occur during normal operating conditions but also limits catastrophic fluid loss to only this short time period, which is typically in the range of 30 to 300 seconds. In an embodiment of the invention, Do is the maximum amount of time that said system shutoff valve may remain energized, regardless of the value of Pa.

K) $T_{L2}$ Second Time Interval for Lockout of System Shutoff Valve Actuation (Third Predetermined Period of Time)

$T_{L2}$ is a time parameter used in an embodiment of this invention. $T_{L2}$ is the set duration of time between starting and ending a third consecutive timing function of said controller, commencing at the conclusion of Do. $T_{L2}$ may be an embodied value in said controller, or may be programmed and or altered specific to a given system. At the conclusion of $T_{L2}$, said first timing function may be allowed to re-initiate.

L) Is Time Interval Between Open Intervals of System Shutoff Valve

The controller may be configured such that Is may be the time interval from one initiation of the opening of said system shutoff valve to the next initiation of the opening of said system shutoff valve, or may be configured as the interval from the timed closing of said system shutoff valve to the next succeeding opening of said system shutoff valve. Is may be established and programmed into said controller during system setup. Is may be no greater than the maximum time interval that will allow Pa to stay greater than Pw, while the system is under normal operating conditions and subject to no aberrant fluid or pressure losses. In a typical operating residential heating system that has had the bulk of the dissolved air purged out, this would likely be at least several days, and may likely be programmable for a period of ten days or more. In a variation, interval Is may be embodied as a calendar based function, such that said system will open said system shutoff open valve at programmed calendar intervals.

Example Calculations and Determination of Values

The following examples of programmable values and the derivation thereof are intended to be exemplary for a typical residential hydronic heating system and should not be construed as limiting.

Establish system minimum pressure:

[(½×system piping height in feet)+5] psi

Verify appliance minimum pressure, for example: 10 psi

Calculate minimum system pressure, for example:

For a typical 2 story house: [½×15 (feet)+5] psi=12.5 psi=Pm

Ps may be set slightly below Pm, such as 12.3 psi

For a single story house: [½×6 (feet)+5] psi=8 psi; must use Pm=10 psi

In this example, it may be preferable to set Ps slightly above Pm, in order to insure system pressure will be maintained above any low pressure limit switch embodied in the appliance.

Verify transducer sensitivity, for example: 0-30 psi at 1% accuracy

Determine and verify expansion tank pre-charge pressure:

Pre-charge may be less than Ps by at least 1.5 times transducer sensitivity, so that system setpoints are always in the range of measurable pressure.

For this example [12.3−(1.5×0.3)] psi=pre-charge pressure; use 11.8 psi

Determine setpoints:

For this example, (2×0.3) psi plus (0.1) psi may be used as the minimum differential between Ps and Pw and also between Pw and Pn.

For the Ps=12.3 psi, Pw may be set at 13.0 psi or above; it may be preferred to use 13.3 psi as a setpoint, to indicate a greater (but still very small) change of fluid volume. With Pw set at 13.3 psi, Pn may similarly be determined to be 14.3 psi, and enabled by a physical setting of the feed valve, or as a programmed setpoint in the controller. Pr may be set at 14.0 psi, to insure a reset even if Pn does not restore to exactly full value.

Establish Do=(elapsed time for feed valve to raise Pa from Ps to Pn (fill time))×(Multiplier>1)

For example system: (150 seconds measured)×(1.5)=225 seconds=Do

Establish $T_{L1}$ and $T_{L2}$:

$T_{L1}$ is reflective of what may be arbitrarily be determined to constitute a rapid or catastrophic leak. Guidance may come by creating a small drip through a system draindown valve, and measuring the elapsed time for Pa to fall from Pn to Ps. In a noticeable leak, this will usually be only a matter of minutes. It may be advisable to also measure the quantity of water released, as this will essentially be a constant that may be correlated with timed events to assist in identifying a possible cause of leakage. It is preferable to set $T_{L1}$ a minimum of five times Do, and typically not less than 15 minutes. Setting $T_{L1}$ at one hour will typically identify a rapid or catastrophic leak, and may consistently allow an initial system refill when the actual rate of leakage is as yet unknown.

$T_{L2}$ is reflective of what may be arbitrarily be determined to constitute a slow or very slow leak. In an intact system, it is possible to operate for an entire heating season without adding any fluid. A corroding fastener that penetrates radiant tubing may typically take several days to initially release a significant volume of water. A typical setting of $T_{L2}$ of 5 to 10 days will identify a slow, or possibly accelerating, rate of leakage that may definitely be attributed to some breach of the system. If Pa falls from Pn to Ps during $T_{L2}$, a slow leak is identified. If Pa falls from Pn to Pw during $T_{L2}$, a very slow leak is identified. This may be indicative of a component condition, such as a valve stem leak, or a leaking fitting. At initial system startup, and for a period of a week to a month thereafter, air extraction may be a greater factor. It may be preferred, during this time period, to set $T_{L2}$ to a much lower value, typically 1 to 3 days, to allow adding make-up water as necessary.

System Elements

Figure 2:
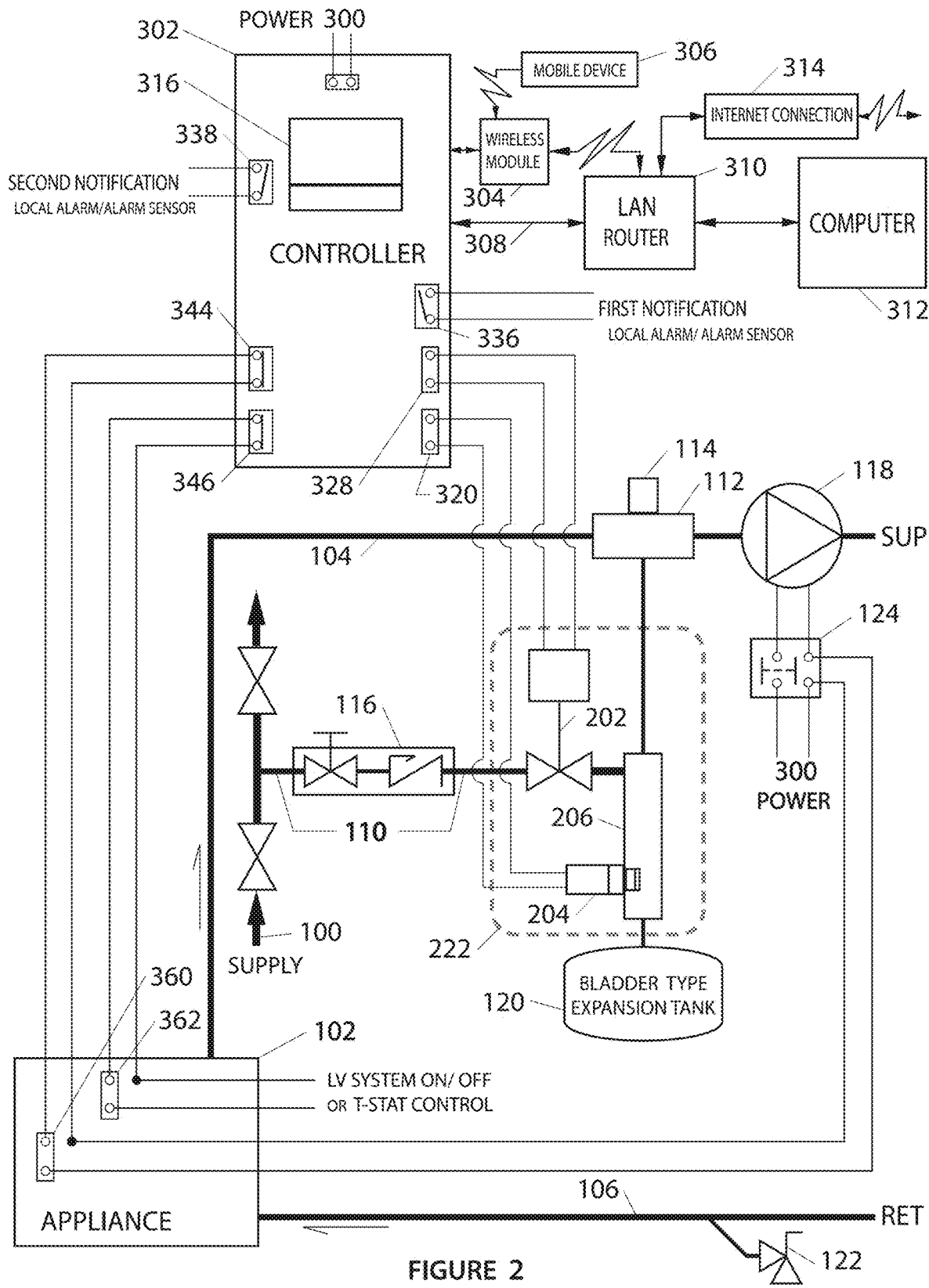
FIG. 2 is a schematic representation of a closed loop fluid heat transfer system including a leak detection system according to a first system embodiment of the present invention.

A first system embodiment of the invention may consist of the following elements as described herein and illustrated schematically in FIG. 2. An electrically operated normally closed system shutoff valve 202 may be installed in the fill piping 110 between a fluid source 100 and a hydronic system, for the purpose of allowing or dis-allowing make-up fluid flow through the feed valve 116. In a typical residential heating system, said make-up fluid fill piping 110 can connect to said hydronic system between an expansion tank 120 and an air separator 112.

Typically fluid is drawn from appliance 102 via a system supply pipe 104 through said air separator 112 by the circulator pump 118. Fluid is pushed away around one or more distribution loops and re-enters said appliance 102 through a return pipe 106. Typically said valve 202 can be self-closing on loss of power, and can be capable of holding against a pressure differential greater than the maximum incoming supply fluid pressure.

Said shutoff valve 202 can communicate with a controller 302, by hard-wired connection or by wireless connection, such as, but not limited to Bluetooth. Power to operate said shutoff valve 202 may be supplied by said controller 302, or may be drawn directly from the structure power grid 300. A pressure transducer 204 that generates a signal proportional to hydronic system pressure may be installed in said piping between said expansion tank 120 and said air separator 112, which is the point of no pressure change during operation of said circulator pump 118 of said system.

Said transducer 204 may be combined in a manifold 206 with said system shutoff valve 202, and may also include a mechanical pressure gauge or a gauge port. The proximal installation of a manual boiler drain valve 122 may assist in the setup and adjustment of the pressure values, by facilitating fluid release while simultaneously observing said system pressure. It may be preferred to oversize said expansion tank 120 above minimum system requirements, as this may result in a greater change in fluid volume for a given change in pressure, and thus make it possible for the installed detector to more accurately control said system pressure.

In the example drawings, the relative position in the vertical plane of said air separator 112, air vent 114, expansion tank 120, feed valve 116, shutoff valve 202, and pressure transducer 204, may be construed as the true relationship in the vertical plane in an actual installation. This physical relationship, embodying no traps or reverse sloping piping, may allow for the release of trapped air from the system as a whole, and also prevent air accumulation at the pressure transducer 204 and or gauge, which may otherwise affect actuation. Said pressure transducer 204 may communicate with said controller 302 by hard wire connection or by wireless connection such as, but not limited to Bluetooth. If the pressure transducer 204 communicates with the controller 302 wirelessly, power to operate this transducer may be by a contained battery, or drawn directly from the structure power grid 300, which may incorporate a battery backup.

A microprocessor-based controller 302 may be located separately from or may be unitized in a manifold assembly 222 with said valve 202 and transducer 204. Said controller 302 may incorporate a digital display or a monitor screen 316, which may incorporate a touch screen or may utilize any type of touch pad or buttons, to which together provide for entering system parameters and for the monitoring of system status and functioning.

Said controller 302 may have the capability to communicate wirelessly 304 by cellular phone service directly to a mobile device 306. Said controller 302 may have the capability to communicate with a local area network by any means. This means of communication may be, but is not limited to, a hard-wired connection 308 such as Ethernet or USB, or may be wirelessly 304 by Bluetooth, 802.11 Wi-Fi, or any other system. Wireless communication may be utilized only to communicate with said shutoff valve 202 and said pressure transducer 204, or said controller 302 may communicate with a wireless router 310 that communicates with a local computer 312 or directly with any device that may connect to the Internet 314. Said controller 302 may thusly be programmed and or monitored by said local computer 312 or by any device with an Internet connection.

Said controller 302 may be powered by the structure power grid 300, and may incorporate a battery backup power supply, or may be powered by an integral battery. The controller 302 may monitor said battery and may issue a notification prior to depletion of the battery. Said controller 302 may have an input 320 for the signal from said pressure transducer 204, which may be hard-wired or wireless. Said controller 302 may have an output 328 for operation of said system shutoff valve 202, which may be hard-wired or wireless. If said output 328 is hard-wired, said controller 302 may output a control signal for a power relay that can activate a power circuit for said system shutoff valve 202, or said controller 302 may output the required power to operate said system shutoff valve 202 directly. If said controller 302 communicates with said system shutoff valve 202 wirelessly, the signal received at the valve location may activate a power relay at said location.

The simplest embodiment of this invention may use hard-wired connections between components, with the controller 302 supplying power for the actuation of said system shutoff valve 202, as in a typical residential heating system all components will be located in close proximity to each other in a single building space, thus allowing for short interconnects and visual contact between all components.

Said controller 302 may embody an output 336 for a first notification of falling system pressure, which notification 336 may be the closing of one or more pairs of dry contacts, which may enable the functioning of a local alarm and or enable a first notification via any type of installed home security or monitoring system. Said output 336 for said first notification may simultaneously or exclusively be a power output that may activate a local alarm annunciator, which may be either visual or auditory. Said output 336 for said first notification may be exclusively or simultaneously a wireless signal via Bluetooth, 802.11 Wi-Fi, or any other system, to a LAN router 310, and then to a local computer 312, which may embody an Internet connection 314. Said first notification may be directed to or available to any device with an Internet connection.

Said controller 302 may embody an output 338 for a second notification of additional loss of system pressure. Said output 338 for said second notification may simultaneously or exclusively be a power output that may activate a local alarm annunciator, which may be either visual or auditory. Said output 338 for said second notification may be exclusively or simultaneously a wireless signal via Bluetooth, 802.11 Wi-Fi, or any other system, to a LAN router 310, and then to a local computer 312, which may embody an Internet connection 314.

Said output 338 for said second notification may simultaneously or exclusively supply actuation power to normally closed output relay 344 and or normally closed output relay 346. Actuation of said relay 344 may interrupt the low voltage control circuit 360 and de-energize a power relay 124 of said pump 118, or may directly interrupt the power supply circuit of said pump 118. Actuation of said relay 346 may interrupt the low voltage control circuit 362 of said appliance 102, or may directly or indirectly interrupt the appropriate power circuit. Certain boilers known to the art have an integral freeze protection system for the boiler itself, which allows heat output at pressures as low as 2 or 3 psi. Said units may not typically be de-energized by the described leak detection and safety shutdown invention, as this may dis-enable the low pressure freeze protection capability.

A second variation of said first system embodiment may eliminate the permanent connection to a domestic water supply. The source of make-up fluid for a hydronic system may be a discrete pressurized make-up fluid containment vessel, and may not be restricted as to type of fluid employed. Said vessel can be a bladder type expansion tank, and can typically be pre-charged to a pressure above Pmax of said hydronic system, such that fluid contained within said vessel can be introduced into said hydronic system by the action of said pre-charge pressure acting on said bladder. A pressure regulating valve on the discharge piping of said vessel may be set to a desired value of Pn.

Said vessel can utilize a closure valve and hose connection, for the purpose of filling or re-filling said vessel, up to the pressure limit of said vessel or the capability of the fill source employed. Said vessel may incorporate a pressure gauge for visual monitoring of available make-up fluid, or said vessel may incorporate a pressure transducer or pressure switch on the fluid side of said bladder. When said contained fluid pressure falls to a setpoint at or above Pmax, an input signal to said controller may cause a third notification to be issued by any embodied means. Said storage vessel may incorporate a bleed valve at the high point of the discharge piping of said vessel to allow for purging of air during or after filling said vessel.

A third variation of said first system embodiment may also eliminate the permanent connection to a domestic water supply. The source of make-up fluid for the hydronic system may be a fluid supply tank, which may be open to atmospheric pressure and may have no restriction on type of fluid employed. Said tank may be manually filled or re-filled as necessary. Said fluid can be transferred into said hydronic system by means of an electrically operated pump which may be enabled by said controller during interval Do, in lieu of said system shutoff valve. A pressure regulating valve on the discharge of said pump may be set to a desired value of Pn. A check valve may be embodied in the piping succeeding said pump.

Figure 3:
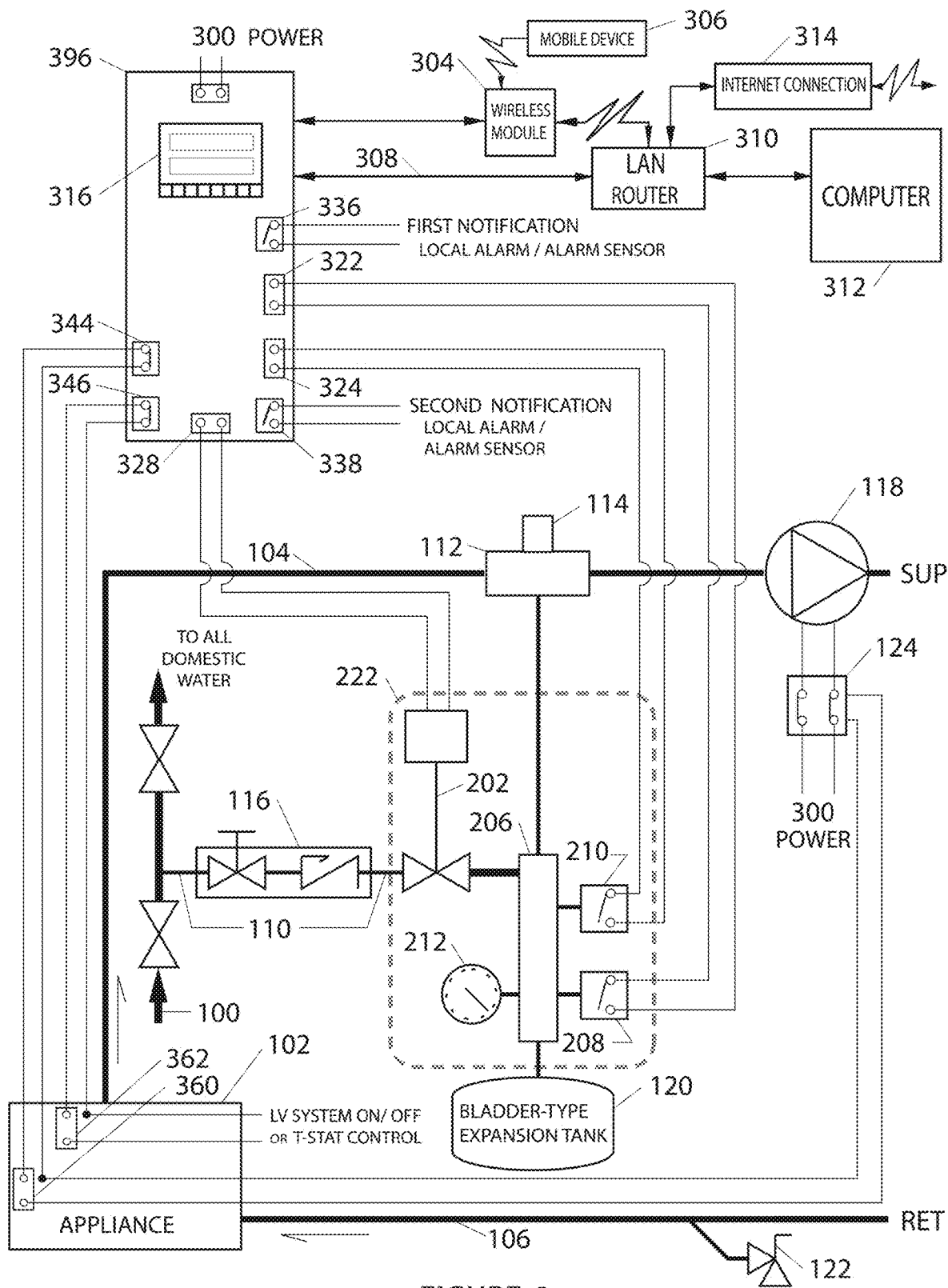
FIG. 3 is a schematic representation of a closed loop fluid heat transfer system including a leak detection system according to a variation of a first system embodiment of the present invention.

A fourth variation of said first system embodiment may consist of the following elements as described herein and illustrated schematically in FIG. 3. Said previously disclosed pressure transducer 204 may be supplanted by two pressure switches 208 and 210, which may be installed in the piping between said expansion tank 120 and said air separator 112. Said pressure switches 208 and 210 may be combined in a manifold 206 with said system shutoff valve 202, and may also include a mechanical pressure gauge 212 or a gauge port. A controller 396 may dispense with the analog to digital converter function typically associated with a previously disclosed pressure transducer 204.

Said first pressure switch 208 may be adjusted and set to close a pair of contacts when system pressure Pa falls to a level Pw. The closing of said pressure switch 208 may complete a controller input circuit 322, and enable the sending of a first notification by any means and or close a normally open relay output 336 which may send a first notification to an installed home security system or a monitoring service for same. Said second pressure switch 210 can be adjusted and set to close a pair of contacts when system pressure Pa falls to a level Ps. The closing of said pressure switch 210 may complete a controller input circuit 324, and enable the sending of a second notification by any means. The closing of said pressure switch 210 may close a normally open relay output 338, which may send a second notification to an installed home security system or a monitoring service for same.

Concurrently said closing of said pressure switch 210 may disable output 328 to said system supply valve 202, so that said valve 202 will self-close and or be prevented from opening. Concurrently said closing of said pressure switch 210 may enable a normally closed relay 344 to interrupt a control circuit 360 in order to de-energize a power relay 124 of said circulator pump 110. Concurrently said closing of said pressure switch 210 may enable a normally closed relay 346 to interrupt an appliance control circuit 362 in order to de-energize said system appliance 102. A plurality of functions may be enabled by an embodiment of said controller 396, or may be enabled by a plurality of external relays that are each energized by the closing of said relay outputs 336 or 338.

Method of Operation

Figure 4:
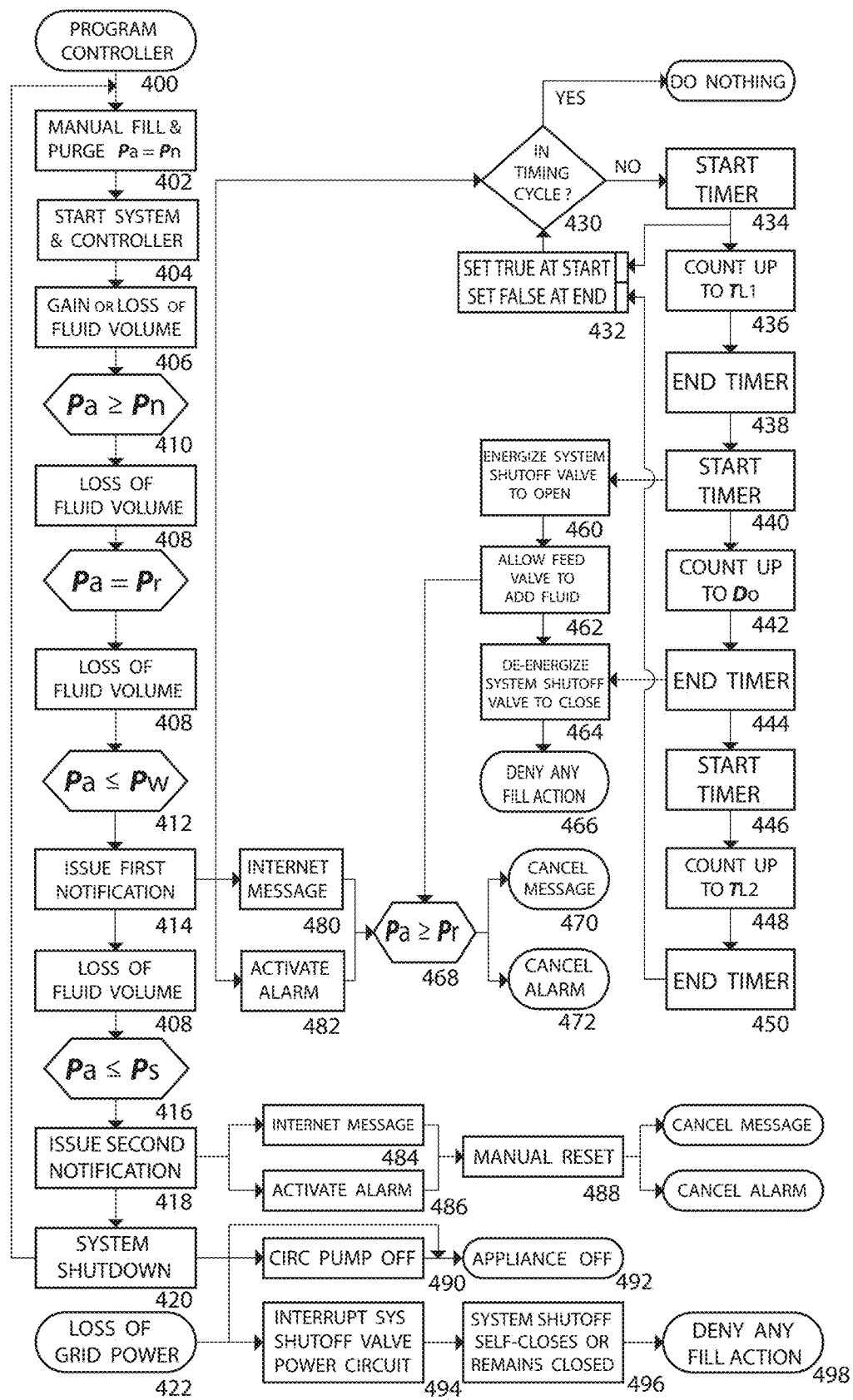
FIG. 4 is a flowchart for a first method of operation of a leak detection system for a closed loop fluid heat transfer system according to a first system embodiment of the present invention.

A first method of operation of a first system embodiment of this invention is as described herein and illustrated conceptually by FIG. 1 and represented as a flowchart in FIG. 4. Element numbers of shapes for operational steps shown in FIG. 4 are indicated herein in parentheses. Values Ps, Pw, Pn and Pr may be calculated for or assigned to a specific system, and programmed (400) in said controller 302. Values of $T_{L1}$, Do and $T_{L2}$ may be embodied in said controller 302, or may be determined and programmed by an installer of a specific system. Said expansion tank 120 pre-charge pressure may be set and verified as less than Ps. Said heat transfer system may be tested and filled (402) to system pressure Pn, and said controller 302 may be tested for proper operation. Said hydronic system and controller 302 may then be made operational (404).

During normal operation of said system, Pa will range from a low pressure of Pl up to some greater pressure Pmax, resulting from the thermal expansion and contraction of the fluid (406), and may be limited by a pressure relief valve that may be incorporated into said system to prevent damage from over-pressurization. Unless energized by said controller 302, said normally closed system shutoff valve 202 may at all times deny the addition of fluid by the feed valve 116. Said fluid volume may be reduced by the extraction of trapped or dissolved air in said system. Said fluid volume may also be reduced at any time by loss of fluid mass, which is to say, system leakage of any kind or cause (408).

The analog signal from pressure transducer 204 at input 320 may be continuously sampled (404) and processed by an analog to digital converter embodied in said controller 302. A digital value of Pa may then be compared to said programmed values Pw and Ps. As long as Pa is greater than Pw (410), said controller 302 may take no action. When Pa is reduced to Pw or less (412), a first notification (414) may be sent by any means (480) as previously described and/or close a normally open relay output 336 which may send a first notification (482) to an installed home security system or a monitoring service for same.

A series of three consecutive timing functions may simultaneously be initiated. A first timer is initiated (434), counts up to $T_{L1}$ (436), ends (438), and then starts (440) a second timer. Said second timer counts up to Do (442), ends (444), and then starts (446) a third timer. Said third timer counts up to $T_{L2}$ (448) and then ends (450). At said start (434) of said first timer a timing cycle (432) enablement register is started. At said end (450) of said third timer, a timing cycle (432) enablement register is canceled. For the duration of said timing cycle (432), said controller 302 may block (430) the re-initiation of said timing cycle.

Said system shutoff valve 202 may be energized open (460) at the start of said second timer (440). Said system shutoff valve 202 may be de-energized closed (464) at the end of said second timer (444). Said opening (460) of said system shutoff valve 202 for duration Do may allow said system feed valve 116 to add fluid (462) as required to raise Pa to Pn, presuming no ongoing fluid losses. De-energizing (464) said system shutoff valve 202 at the conclusion of Do may deny any continued fill action (466) should said feed valve 116 be unable to restore Pa to Pn due to ongoing fluid loss.

If Pa increases to Pr or above (468), said first notification may be canceled (470) and relay output 336 may be opened (472). A sudden increase in rate of fluid loss during Do may prevent Pa from reaching either Pr or Pn, but as energizing of said system shutoff valve 202 is time limited, potential discharge of fluid through any breach is consequently limited as well (466). If at any time Pa falls to Ps or less (416), said controller 302 may issue a second notification (418) by any means (484) as previously described and or close a normally open output relay 338, which may send a second notification (486) to an installed home security system or a monitoring service for same.

Said controller 302 may simultaneously (420) block (494) output 328 and therefore end or prevent the energizing (496) of said system shutoff valve 202, insuring isolation (498) of said hydronic system from said fluid source 100. Said controller 302 may simultaneously (420) open a normally closed output relay 344, to interrupt (490) a control circuit or a power circuit for said circulator pump 118. Said controller 302 may simultaneously (420) open a normally closed output relay 346, to interrupt (492) a control or power circuit for said system appliance 102. By disabling said pump 118 or appliance 102, possible damage to any of said equipment due to operation at less than Pm is thus prevented.

Said controller 302 may not have any means of automatically restoring system pressure after said second notification, and may require a manual reset (488) of said second notifications. Said system may be re-started after inspection, repair and the manual filling and purging (402) of said system to pressure Pn.

A loss of grid power (422) may temporarily produce the same results as does system shutdown (420), by de-energizing said circulator pump 118, appliance 102, and system shutoff valve 202, thereby denying feeding of any leak or breach of said system. A restoration of power may allow said controller 302 to resume (404) said pressure monitoring function and take any actions as may be indicated by said detected pressure value.

The volume of fluid associated with a change in Pa from Pn to Pw and also from Pw to Ps may be essentially constant, such that the programmed values of $T_{L1}$ and $T_{L2}$ may create a time frame for such volume losses, and hence be an indicator of the rate of change of said system pressure, without the need for recording Pa. A rapid or catastrophic leak may be discovered should Pa fall to Ps within $T_{L1}$ of said first timer.

Presuming that Pa may be restored to Pn during Do of said second timer, a slow leak may be discovered should Pa fall to Ps or less within $T_{L2}$ of said third timer, and a very slow leak may be discovered should Pa fall to Pw or less, but remain above Ps, within $T_{L2}$ of said third timer. In such a case, said timing cycle (430) and consequent possible addition of fluid may be allowed to be repeated. Presuming that Pa may be restored to Pn during Do of said second timer, and should Pa remain above Pw for $T_{L2}$ of said third timer, said system may be monitored for subsequent or repeated loss of pressure to Pw. Monitoring may be by embodied data logging by said controller 302, or by an alarm monitoring service, or by manually recording instances of said first notification.

If Pa should fall to Pw only two or three times per year, it may be presumed that said hydronic system is intact and fully functioning as intended. Said controller 302 may be made more sensitive to rate of loss by increasing the values of $T_{L1}$ and or $T_{L2}$. Said controller 302 may be made less sensitive to rate of loss by decreasing the values of $T_{L1}$ and or $T_{L2}$. Less sensitivity may be necessary or desirable in the case of an older system, which may be subject to unavoidable but tolerable fluid losses due to such causes as a failing pump seal or valve stem packing. In said case, $T_{L1}$ and or $T_{L2}$ may be adjusted over time, to allow fluid to be added with greater frequency without invoking system shutdown. A change in the frequency of Pa falling to Pw may indicate a change in circumstance of fluid loss, and may indicate the advisability of investigation. If system leakage is indicated, said leakage may then be searched for visually, or by means of an infrared camera device or by any other means, before serious hidden water damage may occur to the structure.

Figure 5:
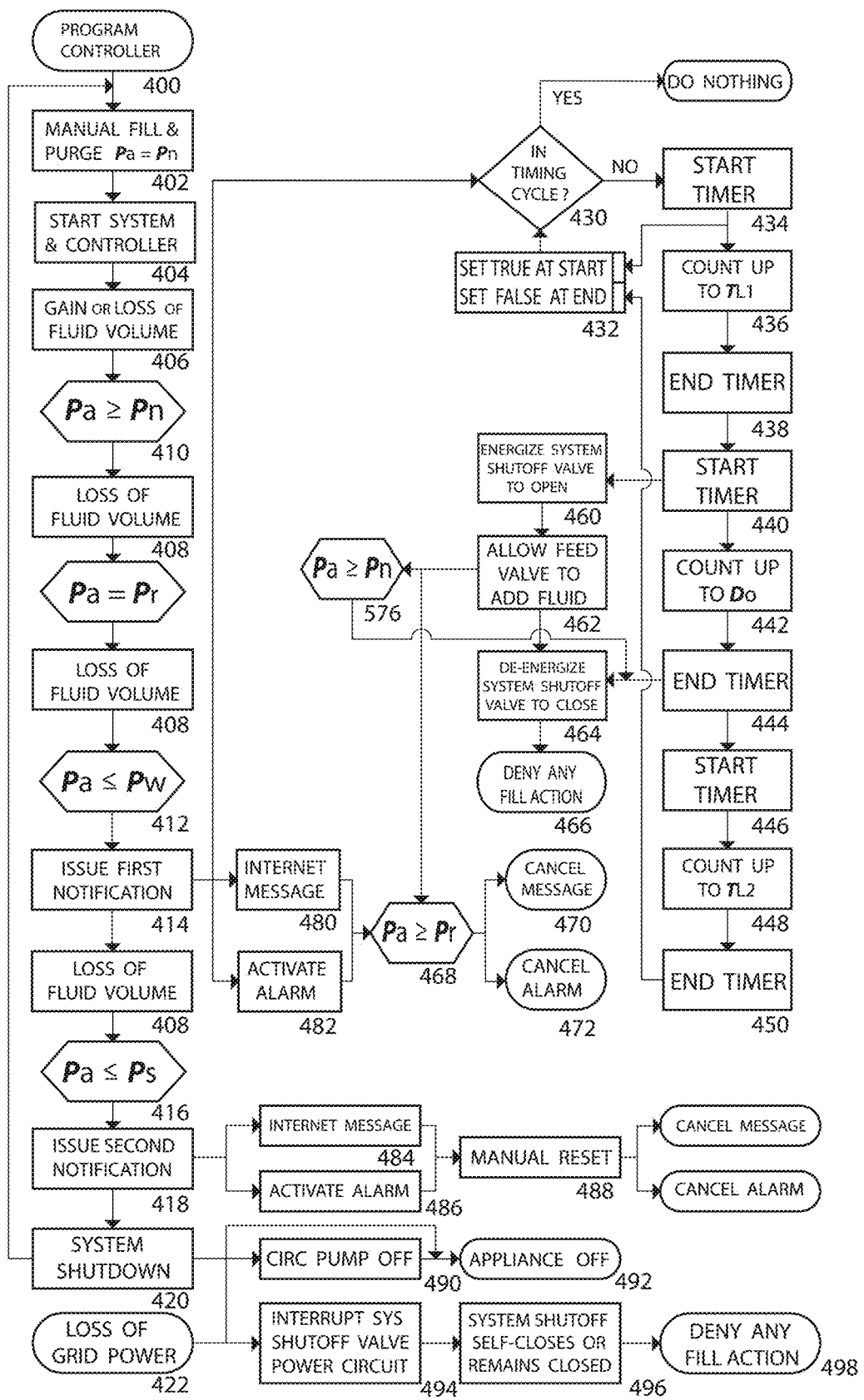
FIG. 5 is a flowchart for a variation of a method of operation of a leak detection system for a closed loop fluid heat transfer system according to a first system embodiment of the present invention.

A second variation of said first method embodiment is described herein and represented by a flowchart in FIG. 5. Element numbers of shapes for operational steps shown in FIG. 5 are indicated herein in parentheses. Said operational steps conform to said first variation methodology, with an additional steps as herein described. Said controller 302 may continuously sample system pressure Pa, and may de-energize (464) output 328 during interval Do, to allow said system shutoff valve 202 to close when Pa equals or exceeds Pn (576).

Said system shutoff valve 202 may be of a type with rapid response time, which may typically be a fraction of a second, and may also be of a low Cv, or coefficient of flow. If said valve 202 is selected so as to be able to reliably limit Pn without consequential pressure overshoot, said feed valve 116 typically associated with a hydronic system may be eliminated. Do (442) may remain as a time limitation for said system shutoff valve 202 to possibly be open, for the purpose of preventing limitless water release under any circumstance.

In a third variation of said first method embodiment, said controller 302 can be programmed with a system start-up cycle, which may embody said first methodology, but may utilize reduced or fractional values of $T_{L1}$ and $T_{L2}$ as has been programmed for normal system operation. Said reduced values can be manually selected, set by programmed calculation relative to said input values, or set to default values by said program logic. At system initiation or at the manual reset and re-starting of said hydronic system after a system shutdown, said controller 302 may run said system methodology for a programmed duration of time, that may typically be seven to thirty days, at said reduced values of $T_{L1}$ and $T_{L2}$. Said duration may be manually programmed or may be embodied in said controller, and may automatically switch to said full values of $T_{L1}$ and $T_{L2}$ at the conclusion of said start-up cycle. Said start-up cycle has the effect of allowing more frequent additions of fluid to said system during the initial period of operation, when there is a probability of greater volume loss due to air extraction.

In a fourth variation of said first method embodiment, said controller 302 can be programmed with a periodic function test cycle for said system shutoff valve 202, in order to regularly verify the ability of said valve 202 to properly operate. Said test cycle may consist of energizing said system shutoff valve 202 open for a short interval, such as, but not limited to, five to thirty seconds. The duration of said interval may be manually programmed or may be embodied in said controller methodology.

Said test cycle may occur at repetitive calendar intervals, which intervals may be a manually entered or at a pre-programmed value, such as but not limited to, once per week or once per month. Said test cycle may occur at repetitive time intervals, which intervals may be a manually entered or a pre-programmed value, such as but not limited to, every seven to thirty days. Said controller 302 may be programmed to deny any said individual test cycle should said test cycle occur during, or overlap with, $T_{L1}$ or $T_{L2}$. Said system shutoff valve 202 may be configured with an end switch, and may be enabled to report each actual successful opening of said valve 202 during said test cycle.

In a fifth variation of said first method embodiment, said controller 302 may not incorporate any or all direct physical control functions or displays 316. Initial set-up and operation of said controller 302 and said associated programming of values may be by action of an ancillary device such as a computer 312 connected directly or through a LAN 310, or by a mobile device 306 connected to said controller 302 through a LAN 310, or directly connected wirelessly 304 by Bluetooth, 802.11 Wi-Fi, or any other means. Said controller 302 may be distributed with, or with access to, a software application for said computer 312 or mobile device 306. Said application may have any of the following attributes:

Setpoints may be by user-defined values, or the application may require the installer to enter raw data concerning the hydronic system, and said application may then calculate and install the setpoints in the microprocessor memory of said controller. Examples of data that may be required may be appliance 102 model number and serial number, specified minimum operating pressure of the appliance 102, height of hydronic piping system, and the measured elapsed time for said feed valve 116 to raise Pa from Ps to Pn.

Operating setpoints such as Pw and Ps may have embedded values relative to input data, or may be configurable by the installer, or alterable by the installer within programmed parameters.

Initiation can require the successful completion of a verification test cycle that may include, but is not limited to, raising Pa from Ps to Pn during time interval Do, and manually releasing fluid from said hydronic system so as to test transmittal of said first notification at Pw and test transmittal of said second notification at Ps.

Said application may receive data from said controller 302 continuously, and or may download data as and when connected to said ancillary or mobile device 306.

Said application may display any available output or setpoint from said controller 302, including, but not limited to, said system setpoints, pressure Pa, duration of Pa less than Pw, and enabled operation of said system shutoff valve 202 as reported by said previously described end switch.

Said application may store initialization data and or said verification test result data. Said stored data may be required as supporting documentation for any warranty or liability claim action initiated by the installer and or the end user.

Said application may send any, or all, available data to a third-party server.

Said application may be configured to allow firmware updates via Internet connection, either automatically or by user permission.

Figure 6:
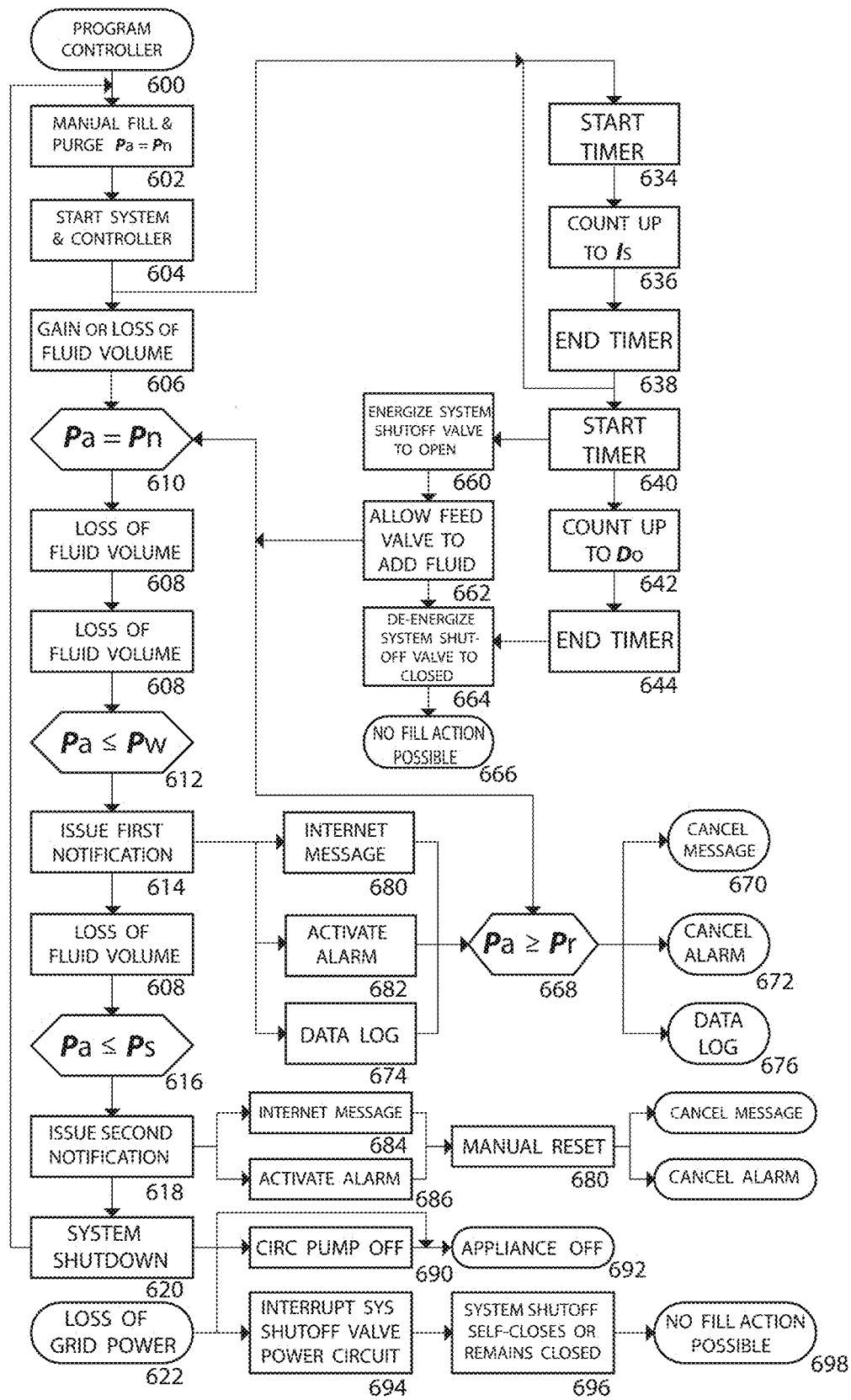
FIG. 6 is a flowchart for a second method of operation of a leak detection system for a closed loop fluid heat transfer system according to a first system embodiment of the present invention.

A second method embodiment of the invention may be as described herein and represented as a flowchart in FIG. 6. Element numbers of shapes for operational steps shown in FIG. 6 are indicated herein in parentheses. Values Ps, Pw, Pn and Pr may be calculated for or assigned to a specific system, and programmed (600) in said controller 302. The values of Is and Do may be determined and programmed (600) by an installer for a specific system, or either may be embodied in the programming of said controller 302. Is may typically be of three to fifteen days duration. Said expansion tank 120 pre-charge pressure may be set and verified as less than Ps. Said hydronic system may be tested and filled (602) to system pressure Pn, and said controller 302 may be tested for proper operation. Said hydronic system and controller 302 may then be made operational (604).

During normal system operation, Pa will range from a low pressure of Pl up to some greater maximum pressure value, resulting from the thermal expansion and contraction of the fluid (606). A pressure relief valve may be incorporated into said system to prevent damage from over-pressurization. Unless energized by said controller 302, said normally closed system shutoff valve 202 may deny the addition of fluid by the feed valve 116. Said fluid volume may be reduced by the extraction of trapped or dissolved air in said system. Said fluid volume may also be reduced by loss of fluid mass, which is to say, system leakage of any kind or cause (608).

Upon startup, said controller 302 may start a periodic first timer (634), count up to Is (636), and then end (638). At each and every timer end (638), the timer count may clear to zero and re-start said timer (634). At the conclusion of each and every interval Is, a second timer may start (640), count up to Do (642), and then end (644). Said system shutoff valve 202 may be energized open (660) for duration Do (642) of said second timer. Said system shutoff valve 202 may be de-energized closed (664) at the end of said second timer (644). Said opening (660) of said system shutoff valve 202 may allow said system feed valve 116 to add fluid (662) if and as necessary to raise Pa to Pn (610), presuming no ongoing fluid losses. A sudden increase in rate of fluid loss during Do may prevent Pa from reaching either Pr or Pn, but as energizing of said system shutoff valve 202 is time limited, potential discharge of fluid through any breach is consequently limited as well (666).

An analog signal from pressure transducer 204 at input 320 may be continuously sampled (604) and processed by an analog to digital converter embodied in said controller 302. The digital value of Pa may then be compared to said programmed values Pw and Ps. As long as Pa is greater than Pw, said controller 302 may take no action. When Pa is reduced to Pw or less (612), a first notification (614) may be sent as previously described (680) and or output relay 336 may be closed to activate (682) a local alarm or home security monitoring system. If, during scheduled time period Do, Pa increases to Pr or above (668), said first notification may be canceled (670) and relay 336 may be opened (672) to cancel said local alarm.

If at any time Pa falls to Ps or less (616), said controller 302 may issue a second notification (618) as previously described (684) and or close output relay 338 to activate (686) a local alarm or home security monitoring system. Said controller 302 may simultaneously (620) block (694) output 328 and end or prevent the energizing (696) of said system shutoff 202, insuring isolation (698) of said hydronic system from said fluid source 100. Said controller 302 may simultaneously open (620) an output relay 344, to interrupt (690) a control circuit 360 or a power circuit for said circulator pump 118. Said controller 302 may simultaneously open (620) an output relay 346, to interrupt (692) a control circuit 362 or power circuit for said system appliance 102. By disabling said pump 118 or appliance 102, possible damage to any of said equipment due to operation at less than Pm is thus prevented.

Said controller 302 may not have any means of automatically restoring system pressure after said second notification, and may require a manual reset (680) of said second notification. Said system may be re-started after inspection, repair and the manual filling and purging (602) of said system to pressure Pn. A loss of grid power (622) may temporarily produce the same results as does system shutdown (620), by de-energizing said circulator pump 118, appliance 102, and system shutoff valve 202, thereby denying feeding of any leak or breach of said system. A restoration of power may allow said controller 302 to resume said pressure monitoring function (604) and take any actions as may be indicated by said detected pressure value.

In a second variation of said second method embodiment said controller 302 may continuously sample system pressure Pa, and may de-energize said output 328 to close said system shutoff valve 202 during interval Do, when Pa equals or exceeds Pn. Said system shutoff valve 202 may be of a type with rapid response time, which may typically be a fraction of a second, and may also be of a low Cv, or coefficient of flow. If said valve is selected so as to enable said controller 302 to reliably limit Pn without consequential pressure overshoot, said feed valve 116 typically associated with a hydronic system may be eliminated. Do may remain as a time limitation for said system shutoff valve 202 to possibly be open, for the purpose of preventing limitless water release under any circumstance.

In a third variation of said second method embodiment, said controller 302 may be programmed with a system start-up cycle, which may embody said second method, but may utilize a reduced or fractional value of Is as has been programmed for normal system operation. Said reduced value may typically be, but is not limited to, one to three days. Said reduced value may be manually selected, set by programmed calculation relative to said input value, or set to a default value by said program logic.

At system initiation or at a manual reset and re-starting of said hydronic system after a system shutdown, said controller 302 may run said system methodology for a programmed duration of time, that may typically be seven to thirty days, at said reduced value of Is. Said duration may be manually programmed or may be embodied in said controller, and may automatically switch to said full value of Is at the conclusion of said start-up cycle. Said start-up cycle has the effect of allowing more frequent additions of fluid to said system during the initial period of operation, when there is a probability of greater volume loss due to air extraction.

In a fourth variation of said second method embodiment, said first notification may not activate an alarm and or an alarm monitoring entity. Said first notification may be transmitted by any embodied means, and may be manually recorded by the recipient. Said first notification may be an entry in a data logging memory, which may be transmitted or made available to recipients as directed. If Pa equals or exceeds Pr, said controller (302) may take equivalent actions to notify as described.

In a fifth variation of said second method embodiment, said controller 302 may not incorporate any or all direct physical control functions or displays 316. Initial set-up and operation of said controller 302 and said associated programming of values may be by action of an ancillary device such as a computer 312 connected directly or through a LAN 310, or by a mobile device 306 connected to said controller 302 through a LAN 310, or directly connected wirelessly 304 by Bluetooth, 802.11 Wi-Fi, or any other means. Said controller 302 may be distributed with, or with access to, a software application for said computer 312 or mobile device 306. Said application may have any of the following attributes:

Setpoints may be by user-defined values, or the application may require the installer to enter raw data concerning the hydronic system, and said application may then calculate and install the setpoints in the microprocessor memory of said controller. Examples of data that may be required may be appliance 102 model number and serial number, specified minimum operating pressure of the appliance 102, height of hydronic piping system and the measured elapsed time for said feed valve 116 to raise Pa from Ps to Pn.

Operating setpoints such as Pw, Ps and Pn may have embedded values relative to input data, or may be configurable by the installer, or alterable by the installer within programmed parameters.

Initiation can require the successful completion of a verification test cycle that may include, but is not limited to, raising Pa from Ps to Pn during time interval Do, and manually releasing fluid from said hydronic system so as to test transmittal of said first notification at Pw and test transmittal of said second notification at Ps.

Said application may receive data from said controller 302 continuously, and or may download data as and when connected to said ancillary or mobile device 306.

Said application may display any available output or setpoint from said controller 302, including, but not limited to, said system setpoints, pressure Pa, duration of Pa less than Pw, and enabled operation of said system shutoff valve 202 as reported by said end switch.

Said application may store initialization data and or said verification test result data. Said stored data may be required as supporting documentation for any warranty or liability claim action initiated by the installer and or the end user.

Said application may send any, or all, available data to a third-party server.

Said application may be configured to allow firmware updates via Internet connection, either automatically or by user permission.

System Elements for a Second System Embodiment

Figure 7:
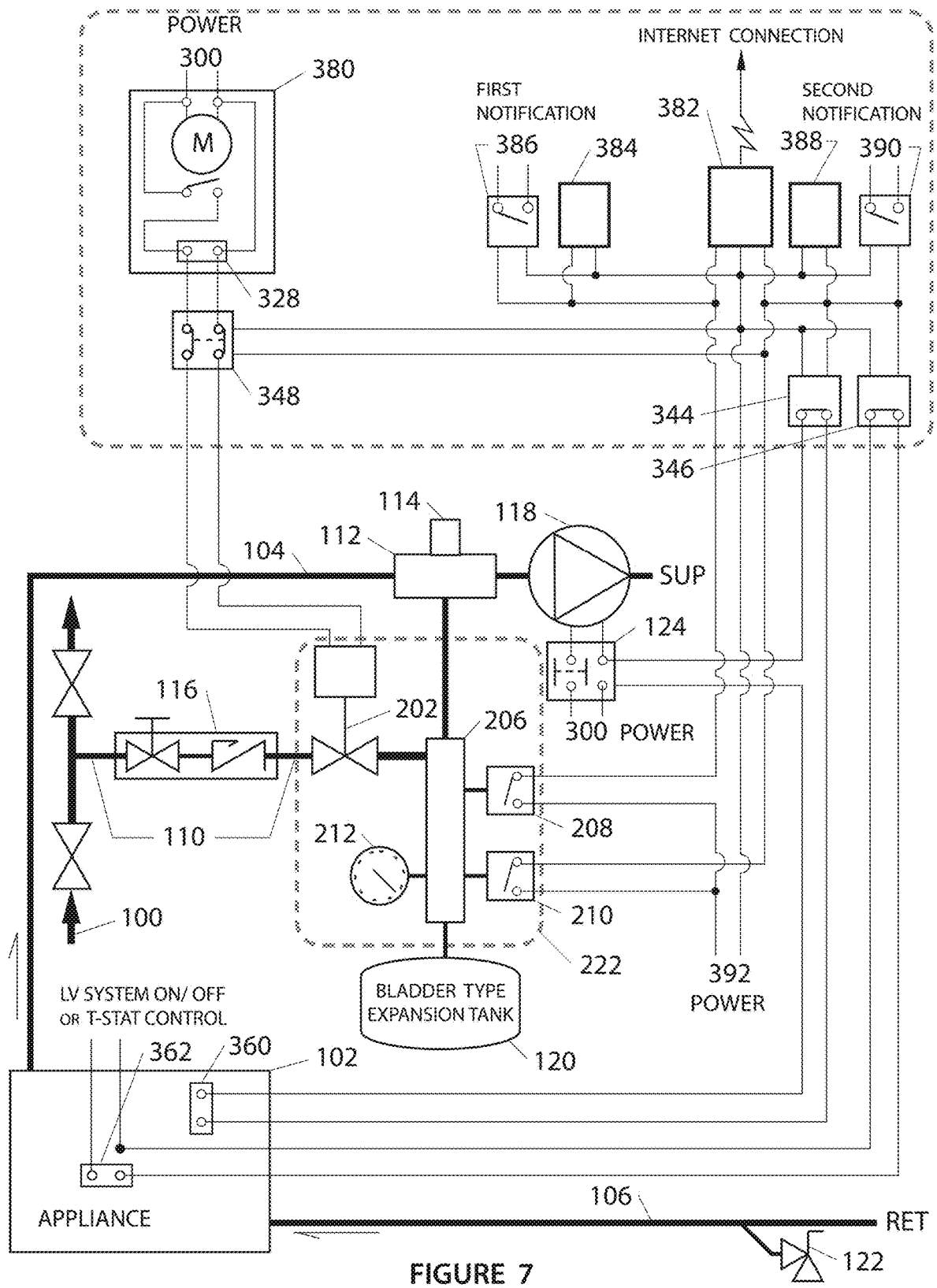
FIG. 7 is a schematic representation of a closed loop fluid heat transfer system including a leak detection system according to a second system embodiment of the present invention.

A second system embodiment may consist of the following elements as described herein and illustrated schematically in FIG. 7. An electro-mechanical timer or electronic timer 380 may be powered by grid power 300 or by a battery source. Said timer 380 may be, but is not limited to, a seven-day timing cycle. It may be preferred to embody a minimum "on" time of no more than one to five minutes. A normally closed relay 348 may interrupt a timer output 328 circuit that may otherwise energize said system shutoff valve 202. A manifold assembly 222, similar to that previously disclosed for a fourth variation of said first system embodiment, may embody a manifold 206, a system shutoff valve 202, a pressure gauge 212, and two pressure switches 208 and 210.

A normally open pressure switch 208 may close at a pre-set falling pressure Pw, and re-open at a pre-set rising pressure Pr. Said switch 208 may enable or disable a relay control circuit. Said relay control circuit may be powered by a source 392 which may be, but is not limited to, 120 volt AC grid power, or 24 volt AC. Said switch 208 may enable a local alarm 384, and or energize a normally open relay 386 to send a first notification to an installed home security system or to a monitoring service for same. Closing said switch 208 may also send an input to an Internet connected device 382. Said device 382 may send a first notification over said Internet by any means, which may be, but is not limited to, cellular phone service or wired or wireless connectivity to a LAN.

A normally open pressure switch 210 may close at a pre-set falling pressure Ps, and re-open at a pre-set rising pressure Pr. Said switch 210 may enable or disable a relay control circuit. Said relay control circuit may be powered by a source 392 which may be, but is not limited to, 120 volt AC grid power, or 24 volt AC. Said switch 210 may enable a local alarm 388, and or energize a normally open relay 390 to send a second notification to an installed home security system or to a monitoring service for same. Closing said switch 210 may also input to an Internet connected device 382. Said device 382 may send a second notification over said Internet by any means, which may be, but is not limited to, cellular phone service or wired or wireless connectivity to a LAN.

Said switch 210 may enable a normally closed relay 348, which may interrupt said output 328 of said timer 380, and cause said valve 202 to close or be prevented from opening. Said switch 210 may enable a normally closed relay 344, which may interrupt a low voltage control circuit 360 to open a power relay 124 and disable said circulator pump 118. Said switch 210 may enable a normally closed relay 346, which may interrupt a low voltage control circuit 362 to disable said appliance 102.

Method of Operation

A method of operation of said second system embodiment may be a variation of said previously disclosed second method of operation. Said timer 380 may be set or programmed for one or more "on" intervals of duration Do. Said value of Do may be determined as previously disclosed. Typically, said timer 380 may embody a seven-day timing cycle, typically with one "on" interval per cycle. Said system shutoff valve 202 may be energized open for duration Do of said timer. Said periodic opening of said system shutoff valve 202 may allow said system feed valve 116 to add fluid if and as necessary to raise Pa to Pn, presuming no ongoing system fluid losses. A sudden increase in rate of fluid loss during Do may prevent Pa from reaching either Pr or Pn, but as energizing of said system shutoff valve 202 is time limited, potential discharge of fluid through any breach is consequently limited as well.

If Pa is reduced to Pw or less, said switch 208 closes, and closes said relay 386 and or activates said local alarm 384. A first notification may be sent by said device 382, by any means as previously described. If, during scheduled time period Do, Pa increases to Pr or above, said alarm 384 and said relay 386 may be de-energized, and cancellation of said first notification may be sent by said device 382.

If at any time Pa is reduced to Ps or less, said switch 210 closes, and activates said alarm 388 and or said relay 390. Said relay 348 may be energized open, to interrupt said output 328 and prevent energizing of said valve 202. Said relay 344 may be energized to disable said circulator pump 118, and said relay 346 may be energized to disable said appliance 102. A second notification may be sent by device 382, by means as previously described. System shutdown may preclude any opening of said valve 202, so that said system may require a manual re-start after inspection, repair and the manual filling and purging of said system to pressure Pn.

System Elements for a Third System Embodiment

Figure 8:
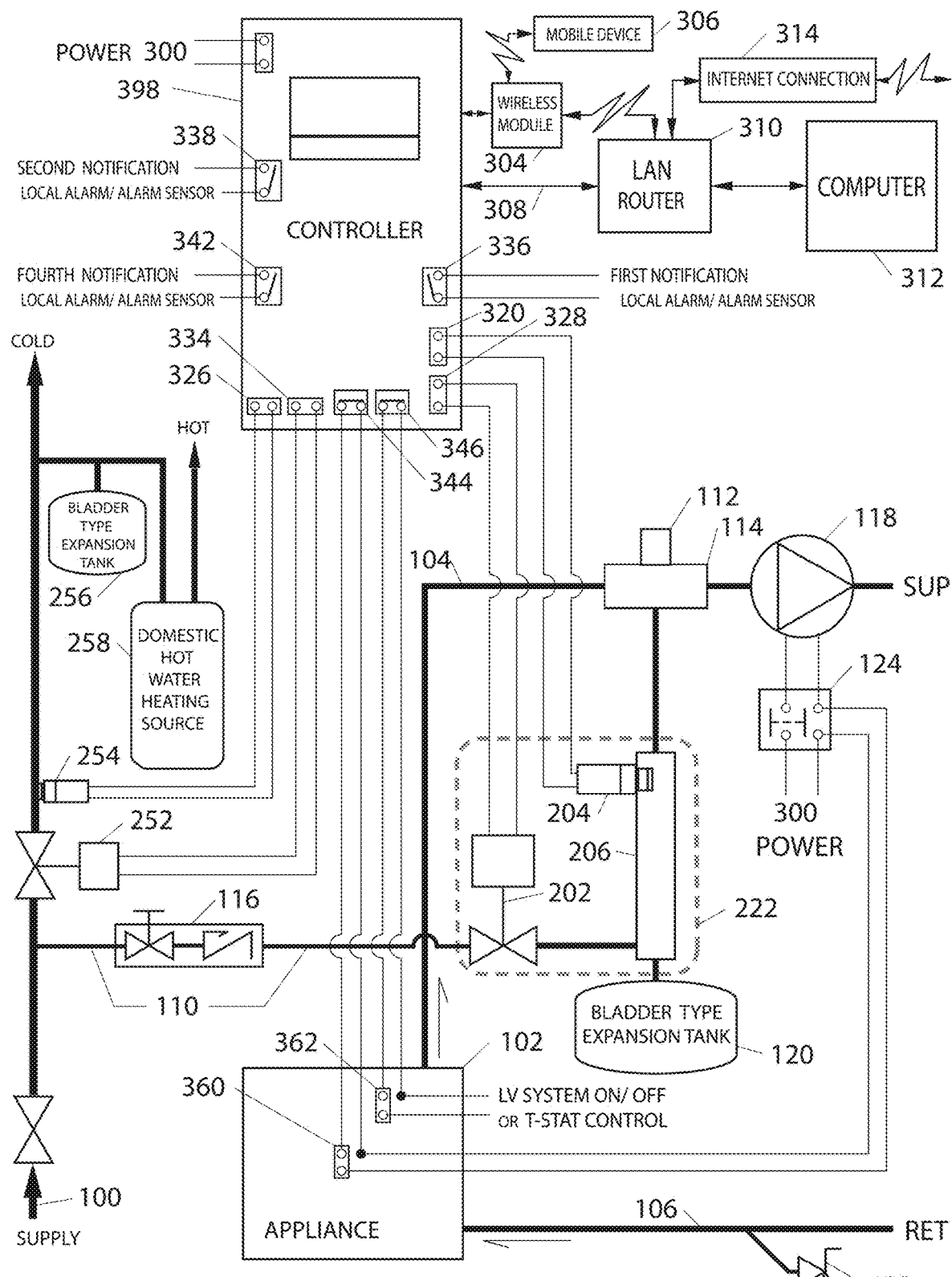
FIG. 8 is a schematic representation of a closed loop fluid heat transfer system including a leak detection system according to a first embodiment of the present invention, with the addition of a domestic water shutoff and pressure monitoring system according to a third system embodiment of the present invention.

A third embodiment may include all elements of a first embodiment and may further consist of the additional following elements as described herein and illustrated schematically in FIG. 8. An electrically operated domestic supply valve 252 may succeed a connection to said hydronic system fill piping 110, and may provide for the isolation of the remainder of the installed domestic water system from the incoming water supply 100. Said domestic supply valve 252 may be capable of holding against a pressure differential greater than the full incoming water supply pressure 100.

Said domestic supply valve 252 can be self-closing on loss of power, thus limiting possible fluid loss in case of a grid power outage, but may allow for a manual override to allow domestic water use during a power outage. Said domestic supply valve 252 may be separate from or be physically embodied with said leak detector system shutoff valve 202, in any of said embodiments of said leak detector system.

A bladder type expansion tank 256 that can be rated for potable water use can be installed in the branch piping that supplies the domestic hot water heating appliance 258. If said domestic supply valve 252 should be closed, said expansion tank 256 may allow for thermal expansion or contraction of the water in the domestic plumbing system, and thereby precludes the necessity of simultaneously shutting off the domestic hot water heating appliance 258.

A pressure transducer 254 may be installed downstream of said domestic supply valve 252. Said domestic pressure transducer 254 may communicate with a controller 398 by a hard wire connection 326 or by a wireless connection such as, but not limited to Bluetooth. If said pressure transducer 254 communicates with said controller 302 wirelessly, power to operate said transducer 254 may be by a contained battery, or drawn directly from the structure power grid 300, which may incorporate a battery backup.

A variation may utilize a pressure switch in lieu of said transducer 254. Said normally open pressure switch may close on a preset falling pressure, and re-open on a pre-set rising pressure.

Said controller 398 may include all elements of a first embodiment and may further consist of the following additional input, outputs, and functions. An output 334 may be enabled to energize said domestic shutoff valve 252. An input 326 may receive an analog signal from said domestic pressure transducer 254. A relay output 342 may enable a fourth notification if actual domestic system pressure falls below a programmed setpoint. Said relay 342 may activate a local alarm and or may send a fourth notification to an installed home security system or to a monitoring service for same. Said controller 398 may be connected to an installed home alarm or security system by any wired or wireless means. Said controller 398 may be connected to a LAN router 310 by any wired 308 or wireless 304 means and or directly connect to a mobile device 306. Said controller 398 may by any previously described means receive an input signal for an UNOCCUPIED condition, and for an OCCUPIED condition.

Figure 9:
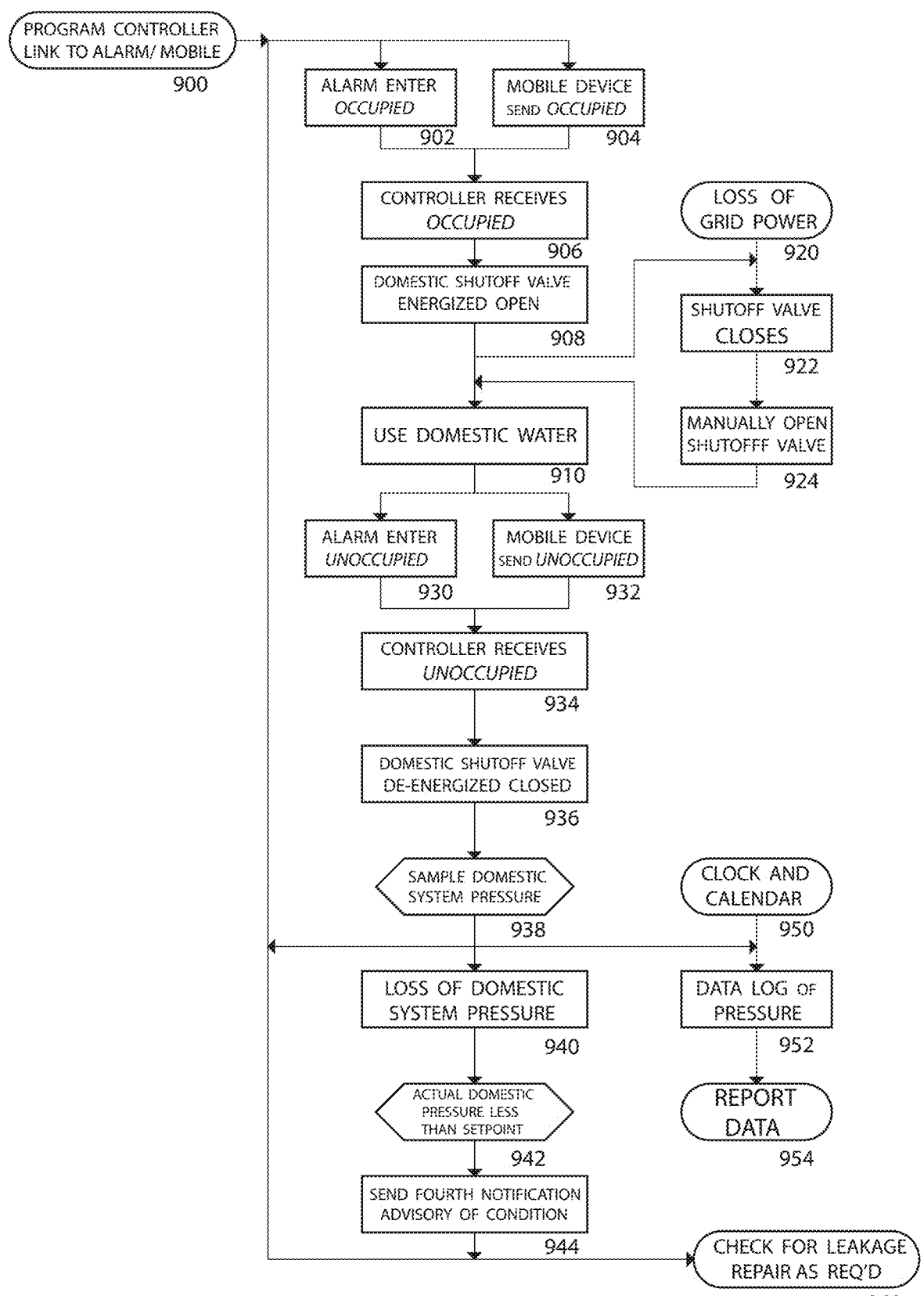
FIG. 9 is a flowchart for a method of operation of a domestic water shutoff and pressure monitoring system according to a third system embodiment of the present invention.

A method of operation of said third system embodiment may be any of said previously disclosed first or second methods of operation, and other functions as described herein and represented as a flowchart in FIG. 9. Element numbers of shapes for operational steps in FIG. 9 are indicated herein in parentheses. Said controller 398 may be programmed and linked (900) to an installed alarm system or mobile device.

A signal (902, 904) to said controller 398 may cause an activation of an OCCUPIED mode (906) and may energize output 334 to cause said domestic supply valve to open (908) and allow normal domestic water use (910). A loss of power (920) may cause said domestic supply valve 252 to close (922), but said valve 252 may provide for a manual override (924) to allow domestic water use during a power outage.

A signal (930, 932) to said controller 398 may cause activation of an UNOCCUPIED mode (934) and may de-energize said output 334 and may cause said domestic supply valve 252 to close (936). Said closing of said domestic supply valve 252 may limit any source or cause of domestic system water loss to be no more than that which is statically contained within said domestic plumbing system. Said function may have the greatest utility at such times as the structure is unattended for long periods, such as seasonal non-use, or vacation periods during the heating season.

During said UNOCCUPIED periods, said controller 398 may continuously sample domestic system pressure (938). Said controller 398 may embody a clock and calendar function (950), and may embody a data log (952) of domestic system pressure values, which may be reported by any embodied means of communication (954). Should the pressure in said domestic system fall (940) to a programmed value (942) below the lowest possible supply pressure and also above the maximum static head pressure of said domestic system, said controller 398 may enable an output 342 to issue a fourth notification (944). Said fourth notification may simultaneously or exclusively be sent to a home alarm system and or to a LAN and or directly to a mobile device. Said fourth notification may indicate a significant loss of pressure in said domestic system during any period while in UNOCCUPIED mode. This indicator may be relied on prior to signaling an OCCUPIED mode (960).

VARIATIONS AND OTHER EMBODIMENTS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

A variation of any of the preceding embodiments may be to control the electrically operated system shutoff valve either locally or remotely, after said first notification has been sent, by conscious action of either the local occupant or a remote monitoring service. A further variation may be to employ a manually operated system shutoff valve, which may be actuated manually after said first notification, by either the occupant or a system service provider. This variation may be utilized for any system not directly connected to a pressurized fluid source, such as, but not limited to, glycol or glycol-water mixes. This variation may dispense with said feed valve and or backflow preventer, as the fill pressure may then be manually controlled.

Another variation may be to send device input data to a remote monitoring service for the purpose of monitoring, recording and acting upon the received inputs; thereby obviating the need for locally installed control logic. Such a variation may also compile data from many systems, and thus be able to learn typical system performance, and thereby be able to better assess causes of system pressure losses. A further variation may be to employ individual electro-mechanical time delay relays to effect intervals $T_{L1}$, Do and $T_{L2}$, in lieu of programmed electronic timing functions embedded in microprocessor memory.

I claim:

1. A method of detecting a leak in a hydronic heating or cooling system, the method comprising:
    providing the hydronic heating or cooling system, the hydronic heating or cooling system being a closed loop and including,
        one or more pressure sensors, the one or more sensors configured to sense when a system pressure drops below or rises above at least first, second, and third pressure set points, the first pressure set point being greater than the second pressure set point and the third pressure set point being greater than the first pressure set point,
        a circulator pump,
        a controller, the controller including a timer and being configured to control operations of the hydronic heating or cooling system responsive to pressure changes indicated by the one or more pressure sensors;
        a system shutoff valve coupled to a fluid supply,
        an expansion tank,
        at least one of a heating appliance and cooling appliance,
        an air separator including an air vent,
        piping fluidly coupling at least the circulator pump, the system shutoff valve, the air separator, the expansion tank, the one or more pressure sensors, and the heating or cooling appliance, and
        a fluid contained in the hydronic heating or cooling system;
    at system initiation, measuring a fill time by opening the system shutoff valve to record the elapsed time to raise the system fluid pressure from the second pressure set point to the third pressure set point;
    periodically sampling system pressure at regular intervals;
    initiating a leak determination cycle when the system pressure drops below the first pressure set point, the leak determination cycle performing in order,
        (1) starting the timer to count a first predetermined period of time and preventing an opening of the system shutoff valve during the first predetermined period of time, the first predetermined period of time being greater than the fill time,
        (2) at the conclusion of the first predetermined period of time, starting the timer to count a second predetermined period of time, the second predetermined period of time being greater than the fill time and less than twice the fill time,
        (3) during the second predetermined period of time, opening the system shutoff valve when the system fluid pressure is greater than the second pressure set point and below the third pressure set point,
        (4) closing the shutoff valve no later than a conclusion of the second predetermined period of time,
        (5) at the conclusion of the second predetermined period of time, starting the timer for a third predetermined period of time, preventing the opening of the system shutoff valve during the third predetermined period of time, and providing a first notification when the system fluid pressure drops below the first pressure set point, the third predetermined period of time being greater than the first predetermined period of time, and (6) providing a second notification when the system pressure drops below the second pressure set point.

2. The method of claim 1, further comprising:
turning off the circulator pump when the system pressure drops below the second pressure set point.

3. The method of claim 2, wherein said first and second notifications comprise one or more of the following: a visual alarm; an audible alarm; an automated telephone call; a text message; an email; and an electronic notification sent to a predetermined device.

4. The method of claim 1, further comprising preventing opening of the system shutoff valve when system pressure drops below the second pressure set point.

5. The method of claim 1, wherein the controller comprises a microprocessor.

6. The method of claim 1, further comprising logging and storing data pertaining to the system initiation, the leak determination cycle, and the sampling of system pressure.

7. The method of claim 1, logging data when the system pressure drops to or below the first pressure set point.

8. A method of detecting a leak in a hydronic heating or cooling system, the method comprising:
providing the hydronic heating or cooling system, the hydronic heating or cooling system being a closed loop and including,
one or more pressure sensors, the one or more sensors configured to sense when a system pressure drops below or rises above at least first, second, and third pressure set points, the first pressure set point being greater than the second pressure set point and the third pressure set point being greater than the first pressure set point,
a circulator pump,
a controller, the controller including a timer and being configured to control operations of the hydronic heating or cooling system responsive to pressure changes indicated by the one or more pressure sensors;
a system shutoff valve coupled to a fluid supply,
an expansion tank,
at least one of a heating appliance and cooling appliance,
an air separator including an air vent,
piping fluidly coupling at least the circulator pump, the system shutoff valve, the air separator, the expansion tank, the one or more pressure sensors, and the heating or cooling appliance, and
a fluid contained in the hydronic heating or cooling system;
at system initiation, measuring a fill time by opening the system shutoff valve to record the elapsed time to raise the system fluid pressure from the second pressure set point to the third pressure set point;
periodically sampling system pressure at regular intervals;
repeatedly performing a leak determination cycle comprising the following operations in order,
(1) starting the timer to count a first predetermined period of time and preventing an opening of the system shutoff valve during the first predetermined period of time,
(2) at the conclusion of the first predetermined period of time, starting the timer to count a second predetermined period of time, the second predetermined period of time being greater than the fill time and less than twice the fill time,
(3) during the second predetermined period of time, opening the system shutoff valve when the system fluid pressure is greater than the second pressure set point and below the third pressure set point,
(4) closing the shutoff valve no later than a conclusion of the second predetermined period of time;
providing a first notification when the system fluid pressure drops below the first pressure set point; and
providing a second notification when the system pressure drops below the second pressure set point and contemporaneously terminating performing operations (1) through (4).

9. The method of claim 8, further comprising:
turning off the circulator pump when the system pressure drops below the second pressure set point.

10. The method of claim 8, wherein said first and second notifications comprise one or more of the following: a visual alarm; an audible alarm; an automated telephone call; a text message; an email; and an electronic notification sent to a predetermined device.

11. The method of claim 8, further comprising preventing opening of the system shutoff valve when system pressure drops below the second pressure set point.

12. The method of claim 8, wherein the controller comprises a microprocessor.

13. The method of claim 8, further comprising logging and storing data pertaining to the system initiation, the leak determination cycle, and said sampling system pressure.

14. The method of claim 8, logging data when the system pressure drops to or below the first pressure set point.

* * * * *